United States Patent [19]

Watanabe et al.

[11] 4,320,207
[45] Mar. 16, 1982

[54] POLYESTER FILM CONTAINING FINE POWDER OF CROSSLINKED POLYMER

[75] Inventors: Masamichi Watanabe; Seiji Sakamoto, both of Yokohama, Japan

[73] Assignee: Diafoil Company Limited, Tokyo, Japan

[21] Appl. No.: 144,047

[22] Filed: Apr. 28, 1980

[30] Foreign Application Priority Data

Jan. 25, 1979 [JP] Japan ................................ 54-7615
May 19, 1979 [JP] Japan ............................... 54-61654
May 19, 1979 [JP] Japan ............................... 54-61655

[51] Int. Cl.$^3$ ............................................ C08L 67/02
[52] U.S. Cl. ..................................... 521/54; 525/176; 525/177
[58] Field of Search ............... 525/176, 177, 437, 438; 521/54

[56] References Cited

U.S. PATENT DOCUMENTS

| | | | |
|---|---|---|---|
| 3,928,254 | 12/1975 | Takayama et al. | 521/54 |
| 3,935,132 | 1/1976 | Gerkin et al. | 521/54 |
| 4,007,141 | 2/1977 | Wismer et al. | 260/2.5 B |
| 4,118,440 | 10/1978 | Jin et al. | 525/176 |

FOREIGN PATENT DOCUMENTS 47-2180 1/1972 Japan .

*Primary Examiner*—Carman J. Seccuro
*Attorney, Agent, or Firm*—Wegner & Bretschneider

[57] ABSTRACT

There is disclosed a polyester film containing from 0.001% to 4% by weight fine particles of a crosslinked polymer having an average diameter of 0.1 to 5$\mu$, said fine particles being derived by pulverization from a crosslinked polymer having a specific surface area of at least 1 m$^2$/g and a pore volume of at least 0.1 ml/g. The films of the present invention are useful as high grade films and afford many advantages in various applications, for example, as magnetic tapes, capacitors, photography, printing plate making, releasing and the like.

2 Claims, No Drawings

POLYESTER FILM CONTAINING FINE POWDER OF CROSSLINKED POLYMER

BACKGROUND OF THE INVENTION

1. Field of the Invention

This invention relates to a polyester film containing a small amount of crosslinked polymer particles dispersed uniformly throughout.

More particularly, it relates to such polyester film containing fine powder (or fine particles or microparticles) of a crosslinked polymer having a particular sharp size distribution which is derived from a crosslinked polymer of specific porosity by pulverization.

2. Description of the Prior Art

In the present day, biaxially oriented films of polyesters, particularly of polyethylene terephthalate have found a wide applications in many technical fields, for example, preparation of gold and silver yarns, stamping foil, printing plate making, reprographics, releasing, photography, packaging and the like as well as electrical applications, for example, as an electrical insulating material, a capacitor dielectrode, a magnetic recording medium and the like, because of their superiority in various properties such as tensile strength, tear strength, modulus of elasticity, transparency, chemical resistance, thermal resistance, etc.

Such polyester films, however, are required to possess a specific combination of properties which is different from one application to another. For example, a so-called translucent polyester film useful for preparation of gold and silver yarns, stamping foil, plate making, releasing and the like is desired to have an excellent workability in handling of the film and to be unsusceptible to impairment of transparency.

Similarly, a polyester film for use in magnetic tapes as audio, video or computer magnetic recording medium is required to have a low coefficient of friction and a high abrasion resistance and to be unsusceptible to degradation of electro-magnetic transducing properties.

For use as a capacitor dielectrode, a polyester film is desired to be superior in workability and electrical characteristics.

As an attempt to improve these properties of polyester films, it has been known that fine particles of an inert material are included in the films by either of the following methods:

(i) Generally the residue of a metallic compound used as an ester exchange catalyst is caused by some means to precipitate as finely divided particles in the system (referred to as "precipitation method").

(ii) Microparticles of an inorganic compound with varying particle size are added from the outside (referred to as "addition method").

These methods, however, suffer from some disadvantages as described below.

According to Method (i), since the amount and diameter of particles precipitated are variable, the slip property of the resulting film is difficult to control and is insufficient considering its high film haze. Another disadvantage is that the original slip property cannot be reproduced after regeneration of the film for reuse.

On the other hand, Method (ii) requires the procedures of pulverization and classification of an inorganic compounds. In addition, an inorganic compound generally has a poor compatibility with the polyester matrix of an organic nature even if the former had been subjected to the above mentioned procedures. Therefore, microparticles of the inorganic compound are difficult to disperse uniformly in polyester and are frequently agglomerated into coarse particles therein. The presence of foreign materials other than fine particles or of coarse particles or badly-dispersed agglomerates of inorganic compounds in a polyester film impairs the film properties, for example, in a film for use in capacitors, by adversely affecting the electrical properties of the film, and, in a film for use in magnetic tapes, by degrading the electro-magnetic transducing characteristics or by causing formation of white dust or drop out.

Therefore, there is a continuing need for an improved polyester film.

SUMMARY OF THE INVENTION

Upon study considering the disadvantages of the prior art polyester film, the following facts have been found: The greatest defect of the added or precipitated particles used in the prior art polyester films for the purpose of affording an improved slipperiness to the film resides in lack of affinity for polyesters. On this account, abrasion between such prior art polyester films or between such a polyester film and another material cause the particles to be removed out of the polyester film or films, which is in turn causes, for example, of formation of white dust and drop out in a film for use in magnetic tapes. Also due to lack of affinity, large voids are formed around the particles during orientation, which in turn impairs transparency of films. Lack of affinity thirdly causes agglomeration of particles, which impairs transparency and aesthetic appearance of films. If particles are agglomerated excessively, blocking of a filter used during film formation of the polyester is severe and in some cases brings about failure of the formed film. The presence of agglomerates is fatal particularly in films for use in capacitors and causes outstanding degradation of electrical properties.

It has now been found that fine particles of a crosslinked polymer obtained by pulverization of a crosslinked polymer having a specific surface area and pore volume can be dispersed uniformly throughout polyester and has an improved affinity for polyester and an extremely sharp size distribution suitable for use as an additive to film-forming polyesters. It has also been found that the crosslinked polymer used in the present invention can be pulverized in a much shorter period and is therefore commercially advantageous. Thus, in accordance with the present invention, there is provided a polyester film containing from 0.001% to 4% by weight fine particles of a crosslinked polymer having an average diameter of 0.1 to 5$\mu$, said fine particles being derived by pulverization from a crosslinked polymer having a specific surface area of at least 1 m$^2$/g and a pore volume of at least 0.1 ml/g.

DETAILED DESCRIPTION OF THE PREFERRED EMBODIMENTS

Further details of the invention will be found in the following description.

By the term "polyester film" as used herein is meant a film derived from a polymer predominantly comprising ethylene terephthalate unit, for example, polyethylene terephthalate or a copolymer of ethylene terephthalate and another comonomer (a third component). The copolymer, if used, preferably comprises at least 80% ethylene terephthalate unit on the molar basis. The polyester film is prepared by forming a molten film of the polyester alone or in combination with another polymer or various additives and drawing the film for orientation.

The polyester can be prepared from terephthalic acid or its ester forming derivative, e.g., dimethyl terephthalate, and ethylene glycol as predominant starting materials by polymerization known per se.

The preparation of the polymer is usually carried out in two steps in which the first step is an ester exchange reaction or esterification reaction in order to obtain a polyester oligomer and the second step, a condensation polymerization reaction. In the ester exchange reaction, one or more of known ester exchange catalysts, for example, compounds of such metals as calcium, manganese, zinc and lithium can be used. After the ester exchange reaction is substantially complete, one or more of phosphorus compounds may be added as modifier of precipitated particles or thermal stabilizer. In the condensation polymerization step, one or more of known catalysts, for example, compounds of such metals as antimony, germanium, titanium, tin and cobalt can be used. Particularly preferred catalysts are antimony and germanium compounds. It is a primary feature of the invention to use a crosslinked polymer having a specific surface area of at least 1 $m^2/g$ and a pore volume of at least 0.1 ml/g as a raw material from which the crosslinked polymer microparticles to be added to the polyester are prepared.

The crosslinked polymer having such porosity used as a raw material to be pulverized into crosslinked polymer microparticles may be prepared, for example, by copolymerizing a monovinyl compound (A) having only one aliphatic unsaturated bond in the molecule and a compound (B) having two or more aliphatic unsaturated bonds in the molecule as a crosslinking agent in the presence of an organic solvent or an organic solvent-soluble polymeric compound (C), and, after completion of the copolymerization, removing the compound (C) from the resulting crosslinked polymer.

In this case, the primary factor deciding whether the fine powder of crosslinked polymer finally obtained has any functional group capable of reacting with polyesters or not is the choice of monovinyl compound (A) used in the copolymerization, although in practice of the invention any crosslinked polymer microparticles as defined above may be used regardless of presence or absence of such functionality. Such groups capable of reacting with polyesters to form a covalent bond include ester, carboxyl, hydroxyl and epoxy groups. The ester groups include acyloxy groups such as acetoxy and propionyloxy, alkoxycarbonyl groups such as methoxycarbonyl and ethoxycarbonyl, phosphate ester groups and the like.

When the fine powder of crosslinked polymer is desired to have the functional group capable of reacting with polyester to form a covalent bond, the crosslinked polymer to be pulverized needs to be prepared using as the monovinyl compound (A), a component of the copolymer, such compound as acrylic acid, methacrylic acid, a lower alkyl ester, e.g., methyl or ethyl ester or glycidyl ester of acrylic or methacrylic acid, maleic anhydride or its alkyl derivative, vinyl glycidyl ether, vinyl acetate, or a styrene derivative having the above-mentioned active group capable of being covalently bonded to polyesters.

On the other hand, when the fine powder of the crosslinked polymer is desired to have no functional group capable of reacting with polyesters, such compounds as styrene and alkyl-substituted styrenes can be used as the monovinyl compound (A), a component of the copolymer, to prepare the crosslinked polymer which is then subjected to pulverization.

Exemplary of compound (B) that is the other component of the copolymer are divinyl compounds such as divinylbenzene, divinyl sulfone, ethyleneglycol dimethacrylate and the like.

For each of comonomers (A) and (B), one or more compounds may be used. In addition, ethylene or similar compounds may be added to the reaction system. Similarly, a nitrogen-containing compound may be copolymerized. While the resulting finely pulverized nitrogen-containing crosslinked polymer tends to provide a discoloration of the polyester, particularly into yellowish shade, it can be used in some applications in which the coloring or discoloration is not a problem.

When the crosslinked polymer has any functional group capable or reacting with polyesters to form a covalent bond, exemplary of such copolymer are methyl acrylate-divinylbenzene and methyl methacrylate-divinylbenzene copolymers. A carboxyl-containing crosslinked polymer may readily be obtained by saponification of the above-exemplified alkyl ester-containing crosslinked polymer or by substituting methacrylic acid and acrylic acid for methyl methacrylate and methyl acrylate, respectively, in practice of copolymerization. Also glycidyl methacrylate-divinylbenzene copolymer can preferably be used. Exemplary of the crosslinked polymer having no functional group capable of reacting with polyesters is styrene-divinylbenzene copolymer. Naturally the resulting crosslinked polymer may be post-treated to introduce a sulfonic acid group or its salt or a tertiary or quaternary ammonium hydroxide or salt group.

In order to provide the resulting crosslinked polymer with porosity, comonomers (A) and (B) are copolymerized in the presence of compound (C). Examples of compound (C) are hydrocarbon compounds such as n-hexane, n-heptane, cyclohexane, kerosine, toluene, xylene, etc., alcoholic compounds such as n-butanol, n-hexanol, propyl alcohol, etc.; and linear polymeric compounds soluble in these organic solvents such as polystyrene, polyvinyl alcohol, polyalkylene oxide, etc. One or more of these compounds are used as compound (C). Preferably the linear polymeric compounds soluble in the organic solvents are used in order to afford the required pores as defined herein to the resulting crosslinked polymers. The amount of the linear polymeric compounds used may be at least 10%, preferably 20 to 100% by weight based on the weight of the crosslinked polymer formed.

The copolymerization of compounds (A) and (B) in the presence of compound (C) may conveniently be initiated with a well-known chemical radical initiator, for example, azoisobutyronitrile, benzoyl peroxide, t-butyl peroxide, cumene hydroperoxide or the like, or by UV irradiation, although it can be initiated merely by heating.

After compound (C) has played its role in providing the crosslinked polymer with porosity, it should be removed out of the polymer. If compound (C) remains in the crosslinked polymer, the efficiency of the subsequent pulverization may be reduced to a certain degree and foaming tends to occur during the polycondensation of the polyester to which the pulverized microparticles of the polymer has been added. When the polymer contains the linear polymeric compound such as polystyrene or polyvinyl acetate, this compound (C) may be removed from the polymer by extraction with an organic solvent, e.g., toluene, which dissolves compound (C). The organic solvent can be then removed through a drying step. Of course, compound (C) need not be removed completely, but it needs to be removed only to such an extent that the advantages of the invention can be developed sufficiently. Thus, the crosslinked polymer which is then subjected to pulverization according to the invention can be obtained. It is another feature of the invention to pulverize the thus obtained crosslinked polymer having a particular specific surface area and pore volume into fine powder of the crosslinked polymer having an average diameter of from 0.1 to 5μ which is particularly suitable for use as additive to polyesters.

Any suitable means for pulvizing the above-mentioned crosslinked polymer which has usually a particle size of the order of ten to several hundred microns may be used. Particularly suitable means are use of jet mill, fluid energy mill or ball mill. Among others, a jet mill and fluid energy mill are particularly preferred. Of course, pulverization may be carried out stepwise using two or more of the milling means. The crosslinked polymer used as the raw material to be pulverized according to the invention is commercially quite advantageous in that the length of time required to pulverization is much shorter. While a so-called gel-type polymer having only the crosslinked structure can be pulverized anyhow to an average particle diameter suitable for use as additive to polyester, the rate of pulverization is low. On the contrary, according to the invention, it takes a half or less of the time consumed in pulverization of the gel-type polymer to obtain microparticles of the same average particle diameter by the same means.

These advantages characteristic of the invention can be developed only when the crosslinked polymers used as the raw material for pulverization have specific surface areas and pore volumes in the specific ranges. It is believed that this is due to the uniform presence of a large number of pores having a specific porosity in the crosslinked polymer used as the raw material, which pores act as initiation sites of pulverization and along which cleavage occurs, resulting in a ready progress of pulverization. Also it is believed that the sharpness of particle size of the pulverized microparticles is due to the relatively uniform spacings between the pores. In other words, the mechanism of pulverization of a nonporous crosslinked polymer is an area pulverization type, whereas according to the present invention the mechanism is a volume pulverization type.

When the raw material used in pulverization is the above-mentioned porous crosslinked polymer, fine powder of the crosslinked polymer having a sharp size distribution can be obtained in a short period of time, and usually a classification step may be omitted, although a classification step may be incorporated as required. Any suitable classification technique for example, the semi-free voltex, forced voltex, hydrocyclone or centrifugal technique may be used.

The above-mentioned process can provide fine powder of the crosslinked polymer having an average diameter of 0.1 to 5μ that is required in the practice of the invention.

If the fine powder has an average diameter of less than 0.1μ, the film made from a polyester containing such microparticles incorporated therein has a low surface roughness, is not provided with sufficient slip properties and has no improved abrasion resistance. If the average diameter exceeds 5μ, the electromagnetic transducing characteristics and electrical characteristics of the film become poor, and the lifetime of the filter used during the film forming step is shorten resulting in an increase frequency of filter exchange and hence a lowered productivity.

In accordance with the invention, the fine powder of crosslinked polymer must be present in an amount of 0.001 to 4% by weight, preferably 0.02 to 0.5% by weight and more preferably 0.03 to 0.2% by weight in the polyester. If this amount is less than 0.001% by weight, the film made from such polyester possesses insufficient slip property and no improvement in abrasion resistance can be obtained. If the amount of the fine powder used exceeds 4% by weight, no further effects on provision of slip property and improvement in abrasion resistance are not gained, and conversely adverse effects such as lowered electromagnetic transducing characteristics and a reduced lifetime of the filter used during the film forming step are brought about.

As described above, the fine powder of crosslinked polymer is obtained by pulverizing a crosslinked polymer having a specific surface area and a pore volume in specific ranges. Naturally the resulting fine powder possesses a crosslinked structure in itself. Since such polymeric fine powder having a crosslinked structure is insoluble and infusible at elevated temperatures during synthesis or forming of the polyester, it is characterized in that it can be dispersed throughout the polyester while retaining its original shape which it assumes at the time of addition to the polyester. The resulting film can be regenerated and reused without decrease in film characteristics, since there occurs no phenomenon that the film fails under stretching stress during orientation as is the case with the precipitated particles.

It is a feature of the invention that the fine powder of the crosslinked polymer has a good affinity for polyester and is dispersed uniformly throughout the polyester regardless of presence or absence of functional groups capable of being covalently bonded to the polyesters. The reason is unknown, but it appears to be that the two materials originally have a good compatibility due to their same organic nature and that the chains of the polyester molecules penetrate the numerous pores remaining in the fine powder of the crosslinked polymer. In the case of fine powder of a crosslinked polymer having functional group capable of reacting with polyesters to form covalent bond, the bond strength of this bonding adds to the affinity.

Therefore, in accordance with the invention, it is necessary to contact thoroughly, and in some cases to react the fine powder of crosslinked polymer with the polyester. For example, if the finely powdered crosslinked polymer is merely added to and blended with the polyester in chip or powder form obtained after completion of polycondensation and the resulting blend is then extruded into film, the length of time for which the fine powder is in contact with the polyester is so short that individual microparticles of the crosslinked polymer powder fail to contact thoroughly or react with the polyester. As a result, no improvement in affinity is obtained and voids are formed around the microparticles during drawing of the film, the voids causing the microparticles to have a tendency to be readily removed out of film surface by slight abrasion. For this reason, it is preferred that the fine powder of crosslinked polymer used according to the invention be added to the reaction system of polyester preparation at a stage before completion of condensation polymerization.

The polymeric fine powder is preferably added as a slurry in ethylene glycol to the polyester-forming reaction system. Suitable slurry concentrations are between about 0.5% and about 20% by weight.

The polyester thus obtained containing the fine powder of crosslinked polymer is then made into film directly or after dilution with another polyester to prepare a desired film. The polyesters used for the purpose of dilution include particle-containing polyesters prepared by the prior art deposition and addition techniques and particle-free polyesters. In any case, the final polyester film must contain from 0.001% to 4% by weight of the polymeric fine powder.

The polyester film is obtained using any film forming technique known per se. For example, polyester may be melt-extruded into film usually at 270° to 295° C. and the film is then cooled and solidified at 50° to 80° C. to form an amorphous sheet, which is subsequently subjected to sequential or simultaneous biaxial orientation in both the machine and cross directions and then to heat treatment at 160° to 240° C. (as described in, for example, Japanese Patent Publication No. 5639/55).

As described above, the use of crosslinked polymer having a particular specific surface area and pore volume as the raw material to be pulverized enables one to obtain in a short time fine powders of the crosslinked polymer having a sharp size distribution and suitable for use as additive to polyesters for film forming applications.

As previously mentioned, it appears that the fine powder of crosslinked polymer still retains numerous pores which polyester molecules can penetrate. Since the microporous fine powder is uniformly dispersed throughout polyester, it is prevented from agglomeration which leads to formation of coarse particles. In addition, each particle of the crosslinked polymer has a good affinity for polyesters. As a result, when a film is made from a polyester containing the particles dispersed throughout, the film possesses many advantages including the facts that formation of voids during orientation and removal of the particles out of film surfaces are avoided and that the film is provided with slip properties and can be regenerated and reused. Such films are hence able to find a wide variety of applications.

In accordance with the present invention, the films possess even and fine surface structure with no coarse protrusion and they are of great utility value as high grade films and afford many advantages in various applications. For example, vapor deposition of a metal onto the films can provide an even and uniform finish of high quality. In applications as magnetic tapes, drop out is avoided and electromagnetic transducing characteristics are improved. For the purpose of capacitors, decrease in electric pressure resisting properties can be avoided. The films of the present invention can further used effectively for the purposes of photography, print making, releasing and the like.

Having generally described this invention, a more complete understanding can be obtained by reference to certain examples which are provided herein for purposes of illustration only and are not intended to be limiting in any manner. In the examples, all parts are by weight and various measurements were obtained using the following methods:

Specific surface area ($m^2/g$):

BET method using dry crosslinked polymers as samples.

Pore volume (ml/g):

Mercury penetration method using dry crosslinked polymers as samples.

Average diameter:

Microscopic procedure wherein dimensions of the largest particle diameter were measured on a micrograph of fine powder or powder-containing polyester sandwiched between cover glasses. The average particle diameter represents the diameter at 50% weight fraction of the weight distribution of a group of spheres whose diameters are the measured largest diameters.

Sharpness of size distribution:

The ratio, $\gamma$, of the diameter at 25% weight fraction and that at 75% weight fraction was used as an index to sharpness of size distribution. As this value approaches 1, the sharpness of size distribution increases.

Slip property:

This was represented by coefficient of friction which was determined in accordance with the procedure of ASTM D-1894 which was modified so as to make it possible to use samples in tape form. Each sample used in the measurement had dimensions of 15 mm wide × 150 mm long and the pulling rate of the sample was 20 mm/min. The measurement was carried out under an atmosphere of a temperature of $21° \pm 2°$ C. and a relative humidity of $65 \pm 5\%$.

Film haze:

Measured in accordance with the procedure of ASTM D1003-61 using a hazemeter, model NDH-2A available from Nippon Denshoku, Japan.

Abrasion resistance:

A film sample was reciprocated between rolles under a given loading and its abrasion resistance was evaluated by the amount of white powder formed during a predetermined test period. For the purpose of evaluation, the results were classified into three ranks in which the highest class was ranked as A.

Filter life:

A molten polymer was extruded at a rate of 8.5 kg/hr through a 1500-mesh filter having a filtration area of 31.2 $cm^2$ until the inlet pressure reached 250 kg/$cm^2$, and the total amount of extrudate obtained at that time was measured and used as a relative index to film life. Higher value of this index is preferred.

Film surface roughness:

Roughness of film surface was measured by a multiple interference method with Surface Finish (Nikon) and the number of interferences per square millimeter was counted using the multiple interference device attached to the apparatus. More rapid decrease in number of interferences of higher order indicates greater evenness of the film surface.

EXAMPLE 1

A. Preparation of fine powder of crosslinked polymer

A homogeneous solution consisting of 100 parts of methyl methacrylate, 35 parts of divinylbenzene, 32 parts of ethylvinylbenzene, 1 part of benzoyl peroxide, 100 parts of toluene and 30 parts of polystyrene having an average molecular weight of 20,000 was dispersed in 700 parts of water. The dispersion was then heated with stirring at 70° C. for 15 hours under nitrogen atmosphere to cause polymerization.

The resulting ester group-containing, granular, crosslinked polymer had an average particle diameter of about 0.2 mm. The polymer thus obtained was washed with water, then subjected to extraction with 500 parts of toluene at room temperature to remove small amounts of unreacted monomer, linear oligomer and polystyrene, washed successively with 200 parts of methanol and 500 parts of water and dried at 80° C. for 24 hours under reduced pressure. The resulting crosslinked polymer has a specific surface area of 7.5 m²/g and a pore volume of 0.9 ml/g.

The crosslinked polymer was then ground preliminarily to an average diameter of 10μ with a jet mill available from Fuji Sangyo, Japan (Model 200 AS). The powder thus obtained was used as a raw material for the subsequent final grinding or pulverization with a sand grinder which was carried out under the following conditions:

| Grinder: | ½G six-cylinder type sand grinder available from Igarashi Kikai Seizo, Japan, 0.5 l vessel capacity. |
|---|---|
| Spindle speed: | 2000 rpm |
| Material to be ground: | 10 wt. % slurry in ethylene glycol. |

The final grinding was carried out for an hour and the resulting fine powder was found to have an average diameter of 2.5μ and an index to sharpness of size distribution, γ, of 1.8.

B. Preparation of polyester

A reactor was charged with 100 parts of dimethyl terephthalate, 70 parts of ethylene glycol and 0.09 part of calcium acetate monohydrate, and 0.04 part of the fine powder of crosslinked polymer (average diameter 2.5μ) as prepared in Part A was added. The mixture was then heated to effect ester exchange reaction. The reaction temperature was initially 165° C. and was raised gradually to 200° C. over 2 hours and to 230° C. over an additional 2 hours.

After 4 hours, to the resulting reaction mixture in which the ester exchange reaction had gone substantially to completion 0.036 part of phosphoric acid and 0.04 part of antimony trioxide were added and the mixture was allowed to polymerize in a conventional manner. The temperature was gradually raised from 230° C., to 280° C., while the pressure which was initially atmospheric was gradually reduced to final pressure of 0.5 mmHg. After 4 hours, the resulting polymer was discharged and made into chips.

C. Preparation of polyester film

The polyester chips as prepared in Part B were melted at 290° C. and extruded through a T-die. The formed film was qunched, then oriented at a draw ratio of 3.5 in each of the machine and cross directions and finally heat-treated. Thus a 25μ-thick film was obtained. The results of evaluation test on this film are summarized in Table 1.

COMPARATIVE EXAMPLE 1

Following the procedures described in Example 1, Part A except that toluene and polystyrene were omitted, the reaction mixture was polymerized and worked up to give a pore-free crosslinked polymer. The resulting ester group-containing, granular, crosslinked polymer had an average diameter of about 0.2 mm, a specific surface area of 0.13 m²/g and a pore volume of 0 ml/g.

The crosslinked polymer was then preliminarily jet milled to an average diameter of 10μ and subsequently final size reduction was attempted under the same conditions as in Example 1. After 1 hour, however, the average diameter of the resulting particles was still 6μ and the value for γ was

COMPARATIVE EXAMPLE 2

The preliminarily jet milled particles having an average diameter of 10μ as prepared in Comparative Example 1 were finally ground for 6 hours with a sand grinder under the same conditions as in Example 1. This prolonged grinding could afford fine powder having an average diameter of 2.5μ, but its value for γ was 2.4.

A 25μ-thick polyester film containing 0.04 part of the fine powder was prepared as described in Example 1, Parts B and C. The results of evaluation tests on the film were given in Table 1 below.

COMPARATIVE EXAMPLE 3

A mixture of 100 parts of dimethyl terephthalate, 70 parts of ethylene glycol and 0.11 part of calcium acetate monohydrate was subjected to ester exchange reaction in a reactor. After completion of the ester exchange reaction, 0.03 part of antimony trioxide was added and the mixture was polymerized in a conventional manner to give a polyester containing precipitated particles of polyester oligomer calcium salt. These precipitated particles had a diameter of about 2μ. The polyester was then formed into a 25μ-thick film as described in Example 1, Part C. The results of evaluation tests on the film are given in Table 1.

COMPARATIVE EXAMPLE 4

In the preparation of polyester film described in Example 1, Part B, the fine powder of crosslinked polymer of 2.5μ average diameter to be added was replaced by 0.04 part of talc having an average diameter of 3μ and a value γ of 3.0. The polyester thus obtained was then formed into a 25μ-thick film as described in Example 1, Part C. The results of evaluation test on the film are given in Table 1.

EXAMPLE 2

A homogeneous solution consisting of 100 parts of butyl methacrylate, 40 parts of ethyleneglycol dimethacrylate, 10 parts of styrene, 1 part of benzoyl peroxide, 100 parts of toluene and 40 parts of polystyrene having an average molecular weight of 15,000 was dispersed in 500 parts of water and the dispersion was heated with stirring at 80° C. for 10 hours under nitrogen atmosphere to cause polymerization.

The resulting copolymer had an average diameter of about 0.15 mm. After it was subjected to extraction, washing and drying as in Example 1, the crosslinked polymer was found to have a specific surface area of 12 m²/g and a pore volume of 1.0 ml/g.

The granular crosslinked polymer was then preliminarily jet milled to an average diameter of 10μ and finally ground under the same conditions as in Example 1. The particles obtained after 1 hour had an average diameter of 3.0μ and a value γ of 1.7.

Following the procedure of Example 1, Part B except for addition of 0.03 part of this 3.0μ average diameter microparticles in place of 0.04 part of the 2.5μ average diameter microparticles, a polyester was prepared and it was then formed into a 25μ-thick film as described in Example 1, Part C.

The results of evaluation tests on the film are given in Table 1 below.

COMPARATIVE EXAMPLE 5

Following the procedure of Example 2 except that toluene and polystyrene were omitted, the mixture was polymerized and worked up to obtain a crosslinked polymer having no pores. This granular crosslinked polymer had an average diameter of about 0.2 mm, a specific surface area of 0.13 m²/g and a pore volume of 0 ml/g.

The granules were then jet milled preliminarily to an average diameter of 10μ and final size reduction of the particles was attempted under the same conditions as in Example 1. After 1 hour, however, the crosslinked polymer particles had still on average diameter of 6μ with a value γ of 2.6.

EXAMPLE 3

Following the procedure of Example 1, Part A except for substitution of 120 parts of glycidyl methacrylate for 100 parts of methyl methacrylate, a granular crosslinked copolymer having an average diameter of about 0.3 mm was prepared. The specific surface area and pore volume of the crosslinked polymer were 10 m²/g and 1.0 ml/g, respectively.

These granules were then subjected to the two-step pulverization into fine powder and a polyester film containing the fine powder of the crosslinked polymer was prepared as described in Example 1, Parts B and C. The results of evaluation tests on the film are given in Table 1.

EXAMPLE 4

A homogenous solution consisting of 100 parts of styrene, 30 parts of divinylbenzene, 27 parts of ethylvinylbenzene, 1 part of benzoyl peroxide, 100 parts of toluene and 30 parts of polystyrene having an average molecular weight of 20,000 was dispersed in 700 parts of water, and the dispersion was heated with stirring at 75° C. for 15 hours under nitrogen atmosphere to cause polymerization.

The resulting crosslinked granular polymer had an average diameter of about 0.2 mm. The polymer was washed with water and then subjected to extraction with 500 parts of toluene at room temperature to remove small amounts of unreacted monomer, linear oligomer and polystyrene. The purified polymer was washed successively with 200 parts of methanol and 500 parts of water and dried at 80° C. for 24 hours under reduced pressure. The resulting dry crosslinked polymer had a surface area of 6 m²/g and a pore volume of 0.7 ml/g.

Thereafter the granular polymer was preliminarily jet milled to an average diameter of 10μ and then subjected to final grinding under the same conditions as described in Example 1, Part A.

After one and a half hours, there was obtained fine powder of the crosslinked polymer having an average diameter of 2.0μ and an index to sharpness of size distribution, γ, of 1.8. A polyester containing 0.05 parts of the fine powder of crosslinked polymer was prepared as described in Example 1, Part B and it was used to prepare a biaxially oriented film of 25μ thickness as described in Example 1, Part C. The results of evaluation tests on the film are given in Table 1 below.

COMPARATIVE EXAMPLE 6

Following the procedure of Example 3 employed in the preparation of the granular crosslinked polymer except that toluene and styrene were omitted, polymerization and subsequent working-up were carried out to prepare a pore-free crosslinked granular polymer, which had an average diameter of about 0.2 mm, a specific surface area of 0.13 m²/g and a pore volume of 0 ml/g.

The granules were preliminarily jet milled to an average diameter of 10μ and then subjected to final grinding under the same conditions as described in Example 1. After one and a half hours, the resulting particles had an average diameter of 6μ with a value γ of 2.5.

COMPARATIVE EXAMPLE 7

The duration of the final grinding of the jet milled particles of 10μ average diameter with a sand grinder was prolonged to 10 hours, and this could afford fine powder having an average diameter of 3.0μ. The value γ of this powder was 2.4. A polyester film containing 0.05 part of the fine powder and having a thickness of 25μ was then prepared as described in Example 1, Parts B and C. The results of evaluation tests on the film are given in Table 1.

EXAMPLE 5

The degree of affinity between particles and polymer matrices in the films of the present invention was evaluated by the degree of void formation under predetermined conditions in the following manner. The unoriented film obtained in each of the examples and comparative examples was drawn at 85° C., at a rate of 7000% per minute and at a draw ratio of 3.5 in each of the machine and cross directions, and the ratio of mean length of major axis and minor axis of a particle to mean length of major axis and minor axis of the void formed around the particle in the film was calculated. The arithmetic mean of the ratios thus obtained with many particles in the film was then calculated and it was used as a measure of affinity between the particles and polymer matrix of the film. A larger value of this arithmetic mean that is closer to 1 indicates that less voids are formed and the film has better affinity. The measures of affinity obtained with the films of Examples 1, 2 and 3 were all not less than 0.9.

In contrast to this, the film each of Comparative Examples 2 and 7 had a measure of affinity of 0.7 which was considerably inferior to those of the films of Examples 1 to 3. In the case of Comparative Example 3 where the particles comprised calcium salt of polyester oligomer, the film was broken under stretching stress and the measurement was impossible. The film of Comparative Example 4 in which the particles comprised talc showed a measure of affinity of 0.4. In any case of comparative examples, the affinity of the particles for the polymer matrix were shown to be insufficient. As is apparent from the results of examples and comparative examples, fine particles of crosslinked polymer having an average diameter of 0.1 to 5μ with a sharp size distribution particularly suitable for use as an additive to polyesters can readily be obtained by use of a crosslinked polymer having a particular specific surface area and pore volume as a raw material to be pulverized.

In addition, the polyester films of the present invention which contains these particles can be effectively used in various applications, since they have excellent film characteristics such as slip property, transparency and abrasion resistance as well as an extremely even and fine surface structure.

In any of the films obtained in examples, the microparticles of the crosslinked polymer were extremely uniformly dispersed throughout the film and substantially no void was found to form around the microparticles. These facts support that the microparticles used in the invention have a good affinity for polyesters.

TABLE 1

|  | Raw material to be pulverized | | Microparticles added | | | Filter life during film formation | Film characteristics | | | | | |
|---|---|---|---|---|---|---|---|---|---|---|---|---|
|  | Specific surface area $m^2/g$ | Pore volume ml/g | Average diameter $\mu$ | Value for $\delta$ | Amount added wt. % | | Coefficient of friction | Haze % | Abrasion resistance | Multiple interference | | |
|  |  |  |  |  |  |  |  |  |  | 2nd order | 3rd order | 4th order |
| Ex. 1 | 7.5 | 0.9 | 2.5 | 1.8 | 0.04 | 1.0 | 0.50 | 3.3 | A | 43 | 2 | 0 |
| Comp. Ex. 2 | 0.13 | 0 | 2.5 | 2.4 | 0.04 | 1.0 | 0.51 | 3.4 | A | 40 | 5 | 1 |
| Comp. Ex. 3 | — | — | 2 | — | — | 1.0 | 1.2 | 2.1 | C | 7 | 1 | 0 |
| Comp. Ex. 4 | — | — | 3.0 | 3.0 | 0.04 | 0.7 | 1.1 | 3.1 | A | 45 | 4 | 1 |
| Ex. 2 | 12 | 1.0 | 3.0 | 1.7 | 0.03 | 1.0 | 0.70 | 2.4 | A | 31 | 3 | 0 |
| Ex. 3 | 10 | 1.0 | 2.6 | 1.8 | 0.07 | 1.0 | 0.45 | 4.5 | A | 68 | 4 | 0 |
| Ex. 4 | 6 | 0.7 | 2.0 | 1.8 | 0.05 | 1.0 | 0.49 | 3.4 | A | 28 | 1 | 0 |
| Comp. Ex. 7 | 0.13 | 0 | 3.0 | 2.4 | 0.05 | 0.8 | 0.60 | 4.3 | B | 19 | 7 | 2 |

Having now fully described the invention, it will be apparent to one of ordinary skill in the art that many changes and modifications can be made thereto without departing from the spirit of the invention as set forth herein.

What is claimed as new and intended to be covered by Letters Patent is:

1. A polyester film containing from 0.001% to 4% by weight fine particles of a crosslinked polymer having an average diameter of 0.1 to 5μ, said fine particles containing numerous pores and being derived by pulverization from a crosslinked polymer having a specific area of at least 1 m²/g and a pore volume of at least 0.1 ml/g, and having a functional group capable of reacting with the polyester to form a covalent bond or from a crosslinked polymer having no functional group capable of reacting with the polyester and obtained by using at least one member of the class consisting of styrene and an alkyl-substituted styrene as a monovinyl component.

2. The polyester film as claimed in claim 1 wherein the fine particles are covalently bonded to the polyester.

* * * * *